United States Patent
Zoican-Loebick (10) Patent No.: US 11,203,721 B1
(45) Date of Patent: *Dec. 21, 2021

(54) PROCESS OF REMOVING A METAL FROM A FLUID HYDROCARBON

(71) Applicant: PRECISION COMBUSTION, INC., North Haven, CT (US)

(72) Inventor: Codruta Maria Zoican-Loebick, North Haven, CT (US)

(73) Assignee: PRECISION COMBUSTION, INC., North Haven, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/914,693

(22) Filed: Jun. 29, 2020

Related U.S. Application Data (63) Continuation-in-part of application No. 16/849,027, filed on Apr. 15, 2020, now Pat. No. 11,015,128.

(Continued)

(51) Int. Cl.
*C10G 25/00* (2006.01)
*C10L 10/04* (2006.01)
(Continued)

(52) U.S. Cl.
CPC .......... *C10G 25/003* (2013.01); *B01J 20/20* (2013.01); *B01J 20/3085* (2013.01);
(Continued)

(58) Field of Classification Search
CPC .. B01D 15/08; B01D 61/027; B01D 67/0039; B01D 53/04; B01J 20/20; B01J 20/0029; B01J 20/08
(Continued)

(56) References Cited

U.S. PATENT DOCUMENTS 3,457,171 A * 7/1969 Flowers ............. B01D 67/0004
210/653
3,785,968 A * 1/1974 WhiteHurst .......... C08F 212/08
208/251 R
(Continued)

OTHER PUBLICATIONS

L. Pan, Z. Wang, Q. Yang and R. Huang, "Efficient Removal of Lead, Copper and Cadmium Ions from Water by a Porous Calcium Alginate/Graphene Oxide Composite Aerogel," Nanomaterials, 2018, 8, 957; doi: 10.3390/nano8110957.
(Continued)

Primary Examiner — Nina Bhat
(74) Attorney, Agent, or Firm — Marie Zuckerman; Andrew D. Gathy

(57) ABSTRACT

A process of removing at least one metal contaminant, such as copper, from a fluid hydrocarbon, for example, crude oil or a liquid hydrocarbon fuel, such as an aviation fuel. The process involves contacting the metal-contaminated fluid hydrocarbon with a sorbent selected from graphene oxide or a functionalized graphene oxide, particularly, a graphene oxide treated with a polycarboxylic acid, such as a saccharide polycarboxylic acid or a salt thereof, examples of which include alginic acid and Group IA and IIA salts thereof. The process removes greater than 99 percent of the metal contaminant without reducing concentrations of advantageous fuel additives, such as, antioxidants, icing inhibitors and corrosion inhibitors. Also described are a purified fluid hydrocarbon composition and a metal contaminant filter system.

25 Claims, 6 Drawing Sheets

Related U.S. Application Data (60) Provisional application No. 62/839,006, filed on Apr. 26, 2019.

(51) Int. Cl.
    *B01J 20/20*     (2006.01)
    *C10L 1/226*     (2006.01)
    *C10L 1/182*     (2006.01)
    *B01J 20/30*     (2006.01)
    *B01J 20/32*     (2006.01)
    *B01J 20/28*     (2006.01)

(52) U.S. Cl.
    CPC .......... *B01J 20/3202* (2013.01); *C10L 1/182* (2013.01); *C10L 1/226* (2013.01); *C10L 10/04* (2013.01); *B01J 20/28061* (2013.01); *B01J 20/28095* (2013.01); *B01J 2220/46* (2013.01); *C10G 2300/205* (2013.01); *C10L 2230/081* (2013.01); *C10L 2230/083* (2013.01)

(58) Field of Classification Search
    USPC ........................................ 208/16; 210/500.12
    See application file for complete search history.

(56) References Cited

U.S. PATENT DOCUMENTS

| | | | | |
|---|---|---|---|---|
| 4,136,021 | A * | 1/1979 | Whitehurst | B01J 31/08 208/251 R |
| 5,051,241 | A | 9/1991 | Pfefferle | |
| 5,082,569 | A * | 1/1992 | Homeier | B01J 39/04 208/251 R |
| 5,401,393 | A * | 3/1995 | Whitehurst | C10G 25/02 208/251 R |
| 6,156,444 | A | 12/2000 | Smith | |
| 6,328,936 | B1 | 12/2001 | Roychoudhury | |
| 7,141,092 | B1 * | 11/2006 | Roychoudhury | B01J 20/183 95/90 |
| 9,156,701 | B2 * | 10/2015 | Ho | C09D 5/24 |
| 9,908,084 | B2 * | 3/2018 | Fish | B01J 20/0285 |
| 10,442,709 | B2 * | 10/2019 | Zheng | B01D 67/0006 |
| 10,449,497 | B2 * | 10/2019 | Biegelsen | C01B 32/198 |
| 10,464,044 | B1 * | 11/2019 | Zoican-Loebick | B01J 20/22 |
| 10,668,447 | B2 | 6/2020 | Zoican-Loebick | |
| 10,702,852 | B2 * | 7/2020 | Janke | B01J 20/321 |
| 11,015,128 | B1 * | 5/2021 | Zoican-Loebick | B01J 20/08 |
| 2003/0024884 | A1 * | 2/2003 | Petrik | B01D 17/0214 210/691 |
| 2006/0134096 | A1 | 6/2006 | Petrik | |
| 2006/0191835 | A1 * | 8/2006 | Petrik | B01J 20/20 210/242.4 |
| 2013/0330833 | A1 * | 12/2013 | Ruiz | B01D 39/1692 436/174 |

OTHER PUBLICATIONS

D. Kong, et al., "Fast and efficient removal of copper using sandwich-like graphene oxide composite imprinted materials," Chemical Engineering Journal, vol. 326 (2017), 141-150.

N. Aghababaei, "Modification of graphene oxide nanosheets for the removal of lead (II) and copper (II) ions from aqueous solutions," Bulgarian Chemical Communications, vol. 48, Special Issue D, 2016, pp. 10-15.

R. Sitko, B. Zawisza, and E. Malicka, "Graphene as a new sorbent in analytical chemistry," Trends in Analytical Chemistry, vol. 51 (2013), pp. 33-43.

R. E. Morris and E. L. Chang, "Development of a Filter to Selectively Remove Copper from Jet Fuels Using a Poly Amine Chelant Immobilized on Silica Gel," Petroleum Science and Technology, 18:9&10 (2000), pp. 1147-1159.

Qin Lu, et al., "Rapid Determination of Dissolved Copper in Jet Fuels Using Bathocuproine," Energy & Fuels, 2003, 17 699-704.

D. B. Puranik, et al., "Copper Removal from Fuel by Solid-Supported Polyamine Chelating Agents," Energy & Fuels, 1998, 12, 792-797.

Unpublished U.S. Appl. No. 16/008,115, filed Jun. 14, 2018, entitled "Sorbent System for Removing Ammonia and Organic Chemicals from a Gaseous Environment," Inventors: C. Junaedi, C. M. Zoican-Loebick, and K. Hawley; Applicant: Precision Combustion, Inc..

\* cited by examiner

PROCESS OF REMOVING A METAL FROM A FLUID HYDROCARBON

CROSS-REFERENCE TO RELATED APPLICATIONS

This application is a continuation-in-part of U.S. patent application Ser. No. 16/849,027, filed Apr. 15, 2020, which claims the benefit of U.S. Provisional Patent Application No. 62/839,006, filed Apr. 26, 2019.

GOVERNMENT RIGHTS

This invention was made with support from the U.S. Government under Contract No. N68335-18-C-0633 and Contract No. 68335-20-C-0182, sponsored by the Department of Defense. The U.S. Government holds certain rights in this invention.

FIELD OF THE INVENTION

This invention pertains to a process of removing a metal from a fluid hydrocarbon, particularly, from a hydrocarbon fuel, such as an aviation fuel, or from a petroleum fraction. In another aspect, this invention pertains to a filtration apparatus for removing a metal from a fluid hydrocarbon.

BACKGROUND OF THE INVENTION

Metal contamination produces adverse effects in catalytic refinery processes, where petroleum is converted into a fuel product comprising a mixture of liquid hydrocarbons as well as in combustion processes employing the liquid hydrocarbon fuel product. Specifically, in such refinery processes at elevated temperature, metal contamination results in catalytic decomposition of the liquid hydrocarbons, thereby resulting in coking and catalyst deactivation. In combustion processes employing a liquid hydrocarbon fuel, such as jet fuel, metal contamination of the fuel results in impaired engine performance and damage to the engine, thereby increasing engine maintenance costs.

Inasmuch as liquid hydrocarbon fuels are transported in copper-nickel piping and stored in copper-nickel storage vessels, liquid hydrocarbon fuels are prone to contamination by formation of copper and nickel organometallic compounds. Contaminant levels of copper-bearing compounds of up to 5,000 parts per billion have been measured. Copper compounds, in particular, disadvantageously reduce a fuel's thermal oxidation stability due to copper's catalytic facilitation of autoxidation.

Chelating agents, such as polyamines, are known to be useful fuel additives for capturing contaminant metals and organometallic species, for example, as disclosed by Dhanajay B. Puranik, et al., in "Copper Removal from Fuel by Solid-Supported Polyamine Chelating Agents," Energy & Fuels, 1998, 12, 792-797. Chelating agents have a claw or ring-like structure that forms at least two bonds with the metal allowing it to be removed. Chelating agents are usually organic compounds. At elevated temperatures chelating agents decompose, disadvantageously releasing the metal back into the fuel with the aforementioned problematical consequences. The prior art also discloses the use of solid filter media, such as silica, clay, zeolites and derivatives thereof, to remove contaminant metals from liquid hydrocarbon fuels. Solid filter media typically do not possess sufficient selectivity for metal-bearing contaminants and have been found, in fact, to remove beneficial fuel constituents and fuel additives, such as icing inhibitors, corrosion inhibitors, lubrication enhancers, antioxidants and others.

In view of the above, a need exists in the art to discover an improved process of removing a metal contaminant, particularly copper-bearing species, from a fluid hydrocarbon, particularly a liquid hydrocarbon fuel, and more particularly an aviation fuel or turbine fuel. It would be beneficial if such a process were able to reduce the concentration of the metal contaminant in the fluid hydrocarbon to less than about 5 parts per billion (5 ppb). It would be more beneficial if such a process were able to reduce the concentration of the metal contaminant without substantially removing and reducing concentrations of beneficial fuel constituents and additives, such as icing inhibitors, corrosion inhibitors, lubrication enhancers, antioxidants, and the like.

SUMMARY OF THE INVENTION

In one aspect, this invention provides for a novel process of removing a metal contaminant from a fluid hydrocarbon, comprising contacting a contaminated fluid hydrocarbon comprising a metal contaminant in an initial metal concentration with a sorbent comprising graphene oxide or a functionalized graphene oxide. The contacting is conducted under conditions sufficient to provide a purified fluid hydrocarbon having a reduced metal concentration of the metal contaminant. As used herein, the term "reduced metal concentration" refers to any metal concentration of the metal contaminant that is less than the initial metal concentration in the fluid hydrocarbon (or a liquid hydrocarbon fuel, as noted hereinafter), such reduced metal concentration including but not limited to non-detectable or essentially zero concentration of the metal contaminant.

In another aspect, this invention also provides for a novel process of removing a metal contaminant from a liquid hydrocarbon fuel, comprising contacting a contaminated liquid hydrocarbon fuel comprising at least one fuel additive provided in an initial additive concentration and a metal contaminant provided in an initial metal concentration with a sorbent comprising graphene oxide or a functionalized graphene oxide. The contacting is conducted under conditions sufficient to provide a purified liquid hydrocarbon fuel comprising the at least one fuel additive in substantially the initial additive concentration and further comprising a reduced metal concentration of the metal contaminant.

In yet another aspect, this invention provides for a purified liquid hydrocarbon fuel comprising a fuel additive, being prepared by a process comprising: contacting a contaminated liquid hydrocarbon fuel comprising at least one fuel additive in an initial additive concentration and a metal contaminant in an initial metal concentration equal to or greater than 5 parts per billion (>5 ppb) with a sorbent comprising graphene oxide or a functionalized graphene oxide; the contacting being conducted under conditions sufficient to produce the purified liquid hydrocarbon fuel comprising the at least one fuel additive in substantially the initial additive concentration and further comprising less than 5 ppb of the metal contaminant.

In one embodiment of the aforementioned processes and composition, the functionalized graphene oxide comprises a graphene oxide treated with an organic polycarboxylic acid or a salt thereof.

In yet another aspect, this invention further pertains to a metal contaminant filter system comprising:
(a) a housing defining an interior and an exterior, said housing having an inlet configured to fluidly couple a source of a fluid hydrocarbon to said interior, said housing having an outlet configured to pass the fluid hydrocarbon to said exterior from said interior;

(b) at least one filter element contained within said interior of said housing; said at least one filter element comprising a sorbent comprising graphene oxide or a functionalized graphene oxide, configured to reduce a metal contamination from said fluid hydrocarbon in contact with said at least one filter element during a predetermined residence time.

The process and metal contaminant filter system of this invention provide for metal decontamination of a fluid hydrocarbon, including fluid hydrocarbon mixtures, such as aviation fuels, via utilization of a graphene oxide sorbent or a functionalized graphene oxide sorbent that selectively sorbs metals. Accordingly, beneficial fuel additives including icing inhibitors, corrosion inhibitors, lubricants, antioxidants, and the like remain substantially unaffected by the decontamination process, thereby remaining in the decontaminated fluid hydrocarbon at substantially their original concentrations and levels of effectiveness. By means of this invention metal contaminants are removed from liquid fuels and other fluid hydrocarbon mixtures without compromising essential beneficial properties of the liquid fuels or hydrocarbon mixtures, for example, properties such as icing inhibition and anti-corrosion properties. More importantly, the process and filter system of this invention offer a viable pathway to improving thermal oxidation stability of a fuel by advantageously removing contaminant metals that catalyze autoxidation of the fuel, which would if left in the fuel lead to coking, impaired engine performance, and increased repair and maintenance costs. Moreover, this invention abates, if not essentially completely eliminates, deactivation of heterogeneous catalysts employed in refinery processes due to chemical or physical deactivation resulting from deposition of contaminant metal and organometallic compounds.

The process of this invention is capable of removing a metal contaminant in a concentration from as low as 5 parts per billion (5 ppb) up to saturation levels from a fluid hydrocarbon or mixture thereof with over 99 percent efficiency. The graphene oxide sorbents employed in the metal contaminant filter system of this invention are conveniently provided in fixed beds as powders or more conveniently supported on mesh, foam, honeycomb, monolith, ring, bead, additively manufactured shapes, or pellet supports, depending upon selected fluid flow velocity and pressure drop provided by design of the filter system. Additionally, in one embodiment the metal contaminant filter system of this invention allows for high mass transfer, low pressure drop, low residence time, and high surface adsorption utilization, as compared for example with powdered filter beds. The system is designed to be provided in a compact, modular form enabling low cost retrofit into existing fuel supply systems.

DETAILED DESCRIPTION OF THE INVENTION

For purposes of clarity and simplicity of language, as used throughout this specification, the singular forms "a", "an" and "the", as they pertain particularly to the fluid hydrocarbon and the metal contaminant include plural referents unless the context clearly dictates otherwise. As an example, "a fluid hydrocarbon" includes reference to a single fluid hydrocarbon as well as a mixture of fluid hydrocarbons. Likewise, "the metal contaminant" includes reference to the single metal contaminant as well as to the mixture of metal contaminants.

In one exemplary embodiment, this invention provides for a novel process of removing a metal contaminant from a fluid hydrocarbon, comprising contacting a contaminated fluid hydrocarbon comprising a metal contaminant, the metal contaminant provided in an initial metal concentration in the fluid hydrocarbon, with a sorbent selected from the group consisting of graphene oxide, graphene oxide treated with an acid, graphene oxide treated with a base, and mixtures thereof. The contacting is conducted under conditions sufficient to provide a purified fluid hydrocarbon comprising a reduced metal concentration of the metal contaminant. As used herein, the term "reduced concentration" refers to any concentration of the metal contaminant that is less than the initial concentration of the metal contaminant in the fluid hydrocarbon (or the liquid hydrocarbon fuel, as noted hereinafter), such reduced concentration including non-detectable or essentially zero concentration of the metal contaminant.

In another exemplary embodiment, this invention provides for a novel process of removing a metal contaminant from a fluid hydrocarbon, comprising contacting a contaminated fluid hydrocarbon comprising a metal contaminant provided in an initial metal concentration in the fluid hydrocarbon, with a sorbent comprising graphene oxide treated with an organic polycarboxylic acid or a salt thereof, the contacting being conducted under conditions sufficient to provide a purified fluid hydrocarbon comprising a reduced metal concentration of the metal contaminant.

In another exemplary embodiment, this invention provides for a novel process of removing a metal contaminant from a liquid hydrocarbon fuel, comprising contacting a contaminated liquid hydrocarbon fuel comprising at least one fuel additive selected from the group consisting of antioxidants, icing inhibitors and corrosion inhibitors provided in an initial additive concentration, and further comprising a metal contaminant provided in an initial metal concentration, with a sorbent selected from the group consisting of graphene oxide, graphene oxide treated with an acid, graphene oxide treated with a base, and mixtures thereof. The contacting is conducted under conditions sufficient to provide a purified liquid hydrocarbon fuel comprising the at least one additive selected from the group consisting of antioxidants, icing inhibitors and corrosion inhibitors provided in substantially the initial additive concentration, and further comprising a reduced metal concentration of the metal contaminant.

In another exemplary embodiment, this invention provides for a novel process of removing a metal contaminant from a liquid hydrocarbon fuel, comprising contacting a contaminated liquid hydrocarbon fuel comprising at least one fuel additive selected from the group consisting of antioxidants, icing inhibitors and corrosion inhibitors provided in an initial additive concentration, and further comprising a metal contaminant provided in an initial metal concentration, with a sorbent comprising graphene oxide treated with an organic polycarboxylic acid or a salt thereof, the contacting being conducted under conditions sufficient to provide a purified liquid hydrocarbon fuel comprising the at least one additive selected from the group consisting of antioxidants, icing inhibitors and corrosion inhibitors provided in substantially the initial additive concentration, and further comprising a reduced metal concentration of the metal contaminant.

In another exemplary embodiment, this invention provides for a purified liquid hydrocarbon fuel prepared by a process comprising: contacting a contaminated liquid hydrocarbon fuel comprising at least one fuel additive in an initial additive concentration, and further comprising a metal contaminant in an initial metal concentration equal to or greater than 5 ppb with a sorbent selected from the group consisting of graphene oxide, graphene oxide treated with an acid, graphene oxide treated with a base, and mixtures thereof. The contacting is conducted under conditions sufficient to produce the purified liquid hydrocarbon fuel comprising the at least one fuel additive in substantially its initial additive concentration and further comprising less than 5 ppb of the metal contaminant.

In another exemplary embodiment, this invention provides for a purified liquid hydrocarbon fuel prepared by a process comprising: contacting a contaminated liquid hydrocarbon fuel comprising at least one fuel additive in an initial additive concentration, and further comprising a metal contaminant in an initial metal concentration equal to or greater than 5 ppb with a sorbent comprising graphene oxide treated with an organic polycarboxylic acid or a salt thereof. The contacting is conducted under conditions sufficient to produce the purified liquid hydrocarbon fuel comprising the at least one fuel additive in substantially the initial additive concentration and further comprising less than 5 ppb of the metal contaminant.

In another exemplary embodiment, this invention provides for a metal contaminant filter system comprising:
(a) a housing defining an interior and an exterior, said housing having an inlet configured to fluidly couple a source of a fluid hydrocarbon to said interior, said housing having an outlet configured to pass the fluid hydrocarbon to said exterior from said interior; and
(b) at least one filter element contained within said interior of said housing; said at least one filter element selected from the group consisting of graphene oxide, graphene oxide treated with an acid, graphene oxide treated with a base, and mixtures thereof, said at least one filter element being configured to reduce a metal contamination from said fluid hydrocarbon in contact with said at least one filter element during a predetermined residence time The fluid hydrocarbon employed in this invention comprises any single hydrocarbon compound or mixture of hydrocarbon compounds that exists in a liquid or gaseous phase at a temperature ranging from about $-40°$ C. to about $+100°$ C. at a pressure of about 1 atm (+/−10 percent). The skilled person will appreciate that a hydrocarbon typically consists of carbon and hydrogen atoms. The fluid hydrocarbon is derivable from fossil fuels, crude oil, petroleum refining, plant-based biofuels, and synthetic fuels derived from Fisher-Tropsch or olefin oligomerization processes. Suitable non-limiting examples of the liquid hydrocarbon and mixtures thereof include C6-24 hydrocarbon compounds, non-limiting examples of which include hexane, octane, and decane, as well as hydrocarbon mixtures including gasoline, kerosene, diesel, crude oil, and aviation fuels, such as jet propulsion fuels including JP-5, JP-8 and Jet A; as well as refinery fractions including, for example, gas oil and FCC light, medium, and heavy oils. In one embodiment the fluid hydrocarbon further comprises one or more of alcohols, ethers, esters, and other common oxygenated organic compounds, which can be present in amounts up to 20 weight percent of the fluid hydrocarbon or mixture thereof.

In one exemplary embodiment, the fluid hydrocarbon comprises a liquid hydrocarbon fuel comprising at least one fuel additive. Typically, a variety of fuel additives are added to the liquid hydrocarbon fuel for the purpose of preserving or enhancing one or more beneficial properties of the fuel. Such additives typically include icing inhibitors, corrosion inhibitors and lubricity enhancers as well as antioxidants, anti-static agents, emulsifiers and biocides.

The icing inhibitor prevents formation of ice in fuel lines. Aviation fuels typically contain a small quantity of water that is not in droplet form; however, as environmental temperature drops, either during high altitude airplane flight or in land-based storage tanks and pipe lines, the water in the fuel can separate out and freeze, clogging fuel lines and filters. In one embodiment a fuel system icing inhibitor (FSII), comprising nearly pure ethylene glycol monomethyl ether, is added to the fuel to inhibit icing. Other icing inhibitors include isopropyl alcohol and a mixture of ethylene glycol monomethyl ether, ethanol, and methyl carbitol.

The corrosion inhibitor is typically a chemical compound that when added to a liquid hydrocarbon fuel decreases corrosion rate of a metallic object, for example, a metallic storage tank, pipe line, or any metallic engine part exposed to the liquid fuel. The corrosion inhibitor typically forms a coating or a passivation layer over the metallic object that prevents the corroding substance from accessing the metallic object, the metallic storage tank, pipe, or engine part as the case may be. Corrosion inhibitors are sometimes referred to as "lubricity enhancers". Benzotriazole is one species of corrosion inhibitor for copper objects; another comprises zinc dithiophosphates. A number of corrosion inhibitors or lubricity enhancers used in the aviation industry as additives to jet fuels include, but are not limited to, DCI-4A, DCI-6A, DCI-4, and DCI-30 (Innospec, Inc., Englewood, Colo.).

The antioxidant is a chemical compound that inhibits oxidation of the liquid hydrocarbon fuel. Non-limiting examples of suitable antioxidants include phenols and alkylated phenols, suitable species of which include 2,6-di-t-butylphenol, and 2,6-di-t-butyl-4-methylphenol (butylated hydroxyl toluene, BHT), as well as 6-t-butyl-2,4-dimethylphenol. Reference is made to IONOL® brand antioxidants (Oxiris Chemicals, S.A., Barcelona, Spain).

The anti-static agent or "static dissipater" is a chemical compound that reduces and/or eliminates static charge build-up in and around a liquid fuel. Typically the anti-static agent comprises a polymeric organic amine or a sulfur-containing compound, such as dodecylbenzene sulfonic acid, or a combination of the organic amine and sulfur-containing compound. Aviation static dissipaters include STADIS® brand 450 and 425 static dissipaters (SDA's) and Dorf Ketal's brand SR 1795 static dissipater.

The biocide is a chemical compound that kills off bacterial and fungal growth in hydrocarbon fuels, a non-limiting example of which includes a class of boranes known as dioxaborinanes, of which naphthalene dioxaborinane is one example. Biobor Jr® brand Biocide (Biobor Fuel Additives, Houston, Tex.) is employed throughout the aviation industry.

The emulsifier is a chemical compound that facilitates emulsification and solution of water present in fuels into the fluid hydrocarbon(s), so as to prevent separation of an aqueous layer.

The contaminated fluid hydrocarbon suitable for the process of this invention comprises at least one metal contaminant. The metal can be present in any form including as elemental metal, or as metal particulates, or as a cation of any appropriate positive charge, or as an organometallic compound wherein a metal or metal ion is complexed to an organic compound contained in the fluid hydrocarbon. In one illustrative embodiment, the metal contaminant comprises at least one transition metal selected from Groups 3 through 12 of the Periodic Table of the Elements. In one illustrative embodiment, the metal contaminant includes at least one metal present in storage tank and piping materials of construction to which the fluid hydrocarbon, particularly the liquid hydrocarbon fuel, is exposed, such metals to include copper and nickel. In another illustrative embodiment, the metal contaminant includes at least one metal found in storage, transport and catalyst systems for petroleum and refinery products, such as gasoline, diesel, and kerosene, these metals to include vanadium, manganese, iron, cobalt, nickel, copper, lead and mixtures thereof. In yet another embodiment, the metal contaminant comprises at least one metal that is naturally-occurring in the fluid hydrocarbon; these particularly including vanadium, iron, and nickel. Accordingly, contaminant metals of particular relevance to this invention are selected from the group consisting of vanadium, manganese, iron, cobalt, nickel, copper, lead and mixtures thereof; more preferred being copper. The total concentration of metallic contaminant(s) typically found in the contaminated fluid hydrocarbon depends upon the source of the fluid hydrocarbon. In one exemplary embodiment, metal contamination in aviation fuels typically ranges from about 5 parts per billion (5 ppb) to about 5,000 ppb by weight. In another exemplary embodiment, metal contamination in petroleum products typically ranges from about 1,000 ppb by weight up to about 1 weight percent of the petroleum product.

The sorbent employable in this invention comprises graphene oxide or a functionalized graphene oxide composition. It should be appreciated that graphene (or reduced graphene oxide) is a form of graphene that contains no surface functional groups. Graphene oxide (GO), on the other hand, is defined as a 2-D sheet of carbon atoms arranged in a hexagonal pattern containing on its surface a plurality of oxygen-containing groups. By reducing graphene oxide, these oxidized functional groups are removed, to obtain a graphene material. This graphene material is called reduced graphene oxide, often abbreviated to "rGO". rGO can also be obtained from graphite oxide, a material made of many layers of graphene oxide, after a series of reduction to graphene oxide and then further to rGO. Graphene can be described as a one-atom thick layer or sheet of graphite. The term "functionalized graphene" refers to graphene that has been chemically modified. In one illustrative embodiment, the graphene is modified with oxygen-bearing substituents, to produce graphene oxide (GO) of use in this invention, as described herein. In another illustrative embodiment, the graphene oxide (GO) is further modified with an acid or mixture thereof to produce an acid-modified functionalized graphene oxide. In yet another illustrative embodiment, the graphene oxide is further modified with a base or mixture thereof to produce a base-modified functionalized graphene oxide. Both acid-treated and base-treated graphene oxide are of use in this invention as described herein.

Graphene oxide (GO) consists essentially of graphene functionalized with oxygen-bearing substituents. Graphene oxide comprises a 2-dimensional crystalline allotrope of carbon in which carbon atoms are densely packed in a regular array of $sp^2$-bonded, atomic scale hexagonal pattern. Graphene oxide further comprises epoxy ( /O\ ) and hydroxyl (—OH) groups (or substituents) bonded to the surface of a graphene sheet as well as carboxyl [—C(O)OH] and hydroxyl (—OH) groups bonded to the edges of the sheet. Generally, the oxygen in graphene oxide occurs as a mixture of hydroxyl, epoxy, and carboxyl substituents and is present in a concentration ranging from about 4 percent to less than about 60 percent, by weight, based on the weight of the graphene oxide. Of these, the carboxyl functionality represents from about 30 to 100 percent by weight of the total oxygen, depending upon how the graphene oxide is prepared.

In another embodiment, the aforementioned graphene oxide is treated with an acid, the acid being selected from inorganic acids as well as organic polycarboxylic acids and salts thereof. Suitable inorganic acids include, without limitation, hydrochloric acid, phosphoric acid, nitric acid, and sulfuric acid, with hydrochloric acid being a preferred embodiment. The organic polycarboxylic acid comprises as least two carboxylic acid substituents [—C(O)OH], each one bonded to a carbon atom in an organic molecule. Among organic polycarboxylic acids, any one of aliphatic polycarboxylic acids, cycloaliphatic polycarboxylic acids, aromatic polycarboxylic acids, and saccharide polycarboxylic acids is suitable. The term "aliphatic polycarboxylic acid" refers to a molecule comprising a chain of saturated carbon atoms that contains a plurality of carboxylic acid substituents. The term "cycloaliphatic polycarboxylic acid" refers to a molecule comprising a cyclic configuration of saturated carbon atoms that contains a plurality of carboxylic acid substituents. The term "aromatic polycarboxylic acid" refers to a molecule comprising an aromatic configuration of carbon atoms that further contains a plurality of carboxylic acid substituents. Optionally, the aforementioned definitions include oxygen and nitrogen atoms within the chain or cyclic saturated or aromatic configuration, as well as oxygen and nitrogen-containing substituents as hydroxyl or amine substituents.

More particularly, salt derivatives of the aforementioned organic polycarboxylic acids are useful, for example, metal salts selected from Groups IA and IIA and the transition metals of the Periodic Table. In one embodiment, the salts are preferably selected from the group consisting of lithium, sodium, potassium, cesium, magnesium, calcium, strontium, barium and mixtures thereof. In one embodiment, the polycarboxylic acid is present in the graphene oxide composite as a water soluble salt, for example, the sodium, potassium or calcium salt thereof.

Illustrative examples of suitable organic polycarboxylic acids include the following non-limiting species: oxalic acid, succinic acid, maleic acid, citric acid, itaconic acid, 1,2,3-propane tricarboxylic acid, 1,2,3,4-butane tetracarboxylic acid, 2,3,5-hexane tricarboxylic acid, phthalic acid, isophthalic acid, terephthalic acid. Polysaccharides are composed of long chains of carbohydrate molecules, specifically, polymeric carbohydrates composed of monosaccharide units bound together by glycosidic linkages. Polysaccharide polycarboxylic acids are polysaccharides containing a plurality of carboxylic acid functionalities, examples of which include alginic acid and chitosan polycarboxylic acid. In one preferred embodiment, the organic polycarboxylic acid or salt thereof is alginic acid and any of its alginate salts, particularly, the sodium, potassium, or calcium alginate salts.

Alginic acid, in particular, comprises a linear copolymer comprising homopolymeric blocks of (1-4)-linked β-D-mannuronate (M) and its C-5 epimer α-L-guluronate (G), respectively. The M and G residues are covalently linked together in different sequences or blocks. The monomers may appear in blocks of homopolymeric G-residues (G-blocks), blocks of homopolymeric M-residues (M-blocks) or blocks of alternating M and G-residues (MG-blocks). The sequence of blocks may be periodic, for example, as in MGMG or MMGMMG, or random, for example as in MGMMMGMGG.

A general method of preparing the acid-treated graphene oxide involves contacting graphene oxide with at least one of the aforementioned acids, the contacting including any of impregnating, immersing, spraying, sonicating, complexing, or otherwise chemically reacting graphene oxide with one or more solutions or slurries containing the acid(s). (It should be appreciated that graphene oxide can be purchased commercially (e.g., Angstron Materials), but can also be prepared by ultrasonicating graphite oxide, or alternatively, prepared by oxidizing graphite with a mixture of strong oxidants, such as sulfuric acid and potassium permanganate, followed by rapid heating of the resultant oxidized graphite under an inert atmosphere.) After contacting the graphene oxide with the acid(s), the resulting composite is washed with water, until the pH of the washings runs neutral, and then dried under air typically at a temperature ranging from about 50° C. to about 120° C. Generally, the acid is loaded onto the graphene oxide in a total amount ranging from about 0.05 weight percent to about 40 weight percent, based on the weight of the graphene oxide.

In another embodiment, the graphene oxide is treated with a base. As such, the graphene oxide is contacted with an amine of the formula $NHR_2$, wherein each R is independently selected from the group consisting hydrogen, $C_{1-5}$ alkyl, and $C_{1-5}$ aminoalkyl; illustrative non-limiting examples of which include methylamine, ethylamine, propylamine, dimethylamine, diethylamine, and dipropylamine. In another embodiment, each R is hydrogen and the amine is ammonia ($NH_3$), suitably provided in an aqueous solution as ammonium hydroxide. More specifically, graphene oxide is solubilized or suspended in a suitable solvent and reacted with the amine at a temperature sufficient to promote the appropriate substitution or thermochemical reaction of the amine with the oxygen functionalities on the graphene oxide. In one preferred synthesis, graphene oxide is reacted with aqueous ammonia (ammonium hydroxide) at a temperature ranging from about 20° C. to about 110° C. The quantity of ammonium hydroxide employed is an excess or at least sufficient to convert 10 percent and up to 100 percent of the oxygen functionalities to nitrogen functionalities. Following the thermal treatment, the solution is filtered and the resulting nitrogen and oxygen-functionalized graphene is washed with water, then dried at a temperature ranging from about 70° C. to 120° C. to obtain the sorbent of this invention. Where the amine ($NHR_2$) is an alkylamine or alkyldiamine, a suitable solvent or diluent, such as water or $C_{1-3}$ alcohol, is employed; or the amine itself acts as the solvent; and the reaction conditions are closely similar to those mentioned above as a person skilled in the art will appreciate.

We believe, although such belief is theory and should not be limiting in any manner, that the amine ($NHR_2$) reacts with the hydroxyl and carboxyl substituents on the graphene oxide giving rise, respectively, to amine (—$NR_2$) and amide [—$C(O)NR_2$] functionalities bonded to the graphene. Additionally, the amine may react with the epoxy substituents on the graphene oxide giving rise to both hydroxyl (—OH) and amine (—$NR_2$) functionalities, although the epoxy substituents are considered to be less reactive than the hydroxyl and carboxyl substituents.

Generally, the acid or base functionalized graphene oxide sorbent of this invention has a particle size correlating substantially to a particle size in a nanoparticle range and closely similar to the particle size of the unmodified graphene oxide sorbent. Since the materials are essentially two-dimensional, the thickness of the particles is significantly smaller than the width of the particles. In typical embodiments, the thickness of the sorbent particles ranges from about 1 nanometer (1 nm) to less than about 50 nm, as determined by transmission electron microscopy (TEM) or scanning electron microscopy (SEM). The width of the particles ranges from greater than about 100 nm, preferably, greater than about 200 nm, to less than about 10 microns (μm). Various conventional methods, such as ball-milling, sonication, and thermal annealing, can be employed to modify the size of the particles and/or to select a range of desired particle sizes. The sorbents of this invention generally exhibit a high surface area. A typical surface area ranges from about 50 $m^2/g$ to about 1,000 $m^2/g$, and in one embodiment, between about 200 $m^2/g$ and about 500 $m^2/g$.

In another embodiment of this invention, the graphene oxide or functionalized graphene oxide is further combined or treated with a metal oxide capable of scavenging metal species, particularly, of scavenging metal species of vanadium, manganese, iron, cobalt, nickel, copper, and lead. Such scavenging metal oxides include, as illustrative examples, aluminas and transition metal oxides, examples of which include iron oxide, zirconia and titania. The combining or treatment of the graphene oxide or functionalized graphene oxide with the scavenging metal oxide is effected by a conventional method, such as mixing, compounding, extruding, impregnating, spray-drying, and the like. Typically, the scavenging metal oxide is provided in a nanoparticle range, that being for this specific purpose a particle size less than about 5 microns (<5 μm) in diameter or critical dimension.

The sorbent is provided to the adsorption process of this invention in any of a variety of physical forms including but not limited to powders, pellets, extrudates, or alternatively, as a layer, laminate or coating coupled to a non-porous or macroporous support, such supports to include ceramic and metallic fibers, meshes, foams, and monoliths. The term "macroporous" refers to pores, channels, or void spaces having a critical diameter or dimension larger than about 0.5 micron (>0.5 μm), and preferably, larger than about 25 μm. In one embodiment, the sorbent is provided as a layer or a coating covering a support in the form of a non-porous wall. In another embodiment, the sorbent is provided as a layer or a coating covering a macroporous support in the form of pellets or extrudates. In another embodiment, the sorbent is applied to a high surface area support, such as a support having a surface area of at least about 100 m²/g for the purpose of increasing access of the fluid hydrocarbon to the sorbent as well as decreasing pressure drop across the sorbent bed. In yet another embodiment, the sorbent further comprises a binder, which functions to impart an acceptable degree of cohesiveness and attrition resistance to the sorbent. Supports and binders for sorbents are found in the art.

In a preferred embodiment, the sorbent is applied as a layer or coating to a high surface area mesh support, preferably, a Microlith® brand mesh support having an ultra-short-channel-length (Precision Combustion, Inc., North Haven, Conn.). The mesh support is in the form of a reticulated net or screen, that is, a substantially two-dimensional lattice wherein a thickness dimension is substantially smaller than length and width dimensions, and wherein the lattice contains a regular or irregular array of short pores and channels. In terms of materials of construction, the mesh support is selected from the group consisting of metal, ceramic, cermet, and woven fiberglass meshes and cloths, and any combination thereof. The mesh is not limited by any method of manufacture; for example, meshes can be constructed via weaving or welding fibers, or by an expanded metal technique as disclosed in U.S. Pat. No. 6,156,444, incorporated herein by reference, or by additive manufacturing (i.e. 3-D printing), or by a lost polymer skeleton method.

In more specific embodiments, the metal mesh support is constructed from any metal or combination of metals provided that the resulting structure is capable of withstanding the temperatures and chemical environment to which the mesh is exposed. Suitable non-limiting materials for the metal mesh support include aluminum alloys, titanium alloys, iron-chromium alloys, iron-chromium-aluminum alloys, and iron-chromium-nickel alloys. Such metal meshes are available commercially, for example, from Alpha Aesar and Petro Wire & Steel. In one embodiment, the metal mesh comprises a Microlith® brand metal mesh obtainable from Precision Combustion, Inc., of North Haven, Conn., USA.

With respect to ceramic meshes, the term "ceramic" refers to inorganic non-metallic solid materials with a prevalent covalent bond, including but not limited to metallic oxides, such as oxides of aluminum, silicon, magnesium, zirconium, titanium, niobium, and chromium, as well as zeolites and titanates. Reference is made to U.S. Pat. Nos. 6,328,936 and 7,141,092, detailing insulating layers of short channel ceramic mesh comprising woven silica, both patents incorporated herein by reference. Pertaining to cermet meshes, the term "cermet" refers to a composite material comprising a ceramic in combination with a metal, the composite being typically conductive while also exhibiting a high resistance to temperature, corrosion, and abrasion in a manner similar to ceramic materials.

More specifically, the mesh support is configured typically with a plurality of channels or pores having a diameter ranging from about 0.25 millimeters (mm) to about 1.0 mm, with a void space greater than about 60 percent, preferably up to about 80 percent or more. A ratio of channel length to diameter is generally less than about 2:1, preferably less than about 1:1, and more preferably, less than about 0.5:1. Preferably, the mesh has a cell density ranging from about 100 to about 1,000 cells or flow paths per square centimeter.

As described in U.S. Pat. Nos. 5,051,241 and 6,156,444, incorporated herein by reference, Microlith® brand mesh technology offers a unique design combining an ultra-short-channel-length with low mass in one monolith, which contrasts with prior art monoliths having substantially longer channel lengths as noted hereinabove. For the purposes of this invention, the term "ultra-short-channel-length" refers to a channel length in a range from about 25 microns (μm) (0.001 inch) to about 500 μm (0.02 inch). In contrast, the term "long channels" pertaining to prior art monoliths refers to channel lengths greater than about 5 mm (0.20 inch) upwards of 127 mm (5 inches).

The loading of the graphene oxide sorbent onto the mesh support is described in units of weight sorbent per unit volume of support; and this advantageously ranges in one embodiment from about 50 mg sorbent per cubic centimeter support (50 mg/cm³) to about 1,500 mg/cm³. In another embodiment, the loading ranges from about 100 mg/cm³ to about 750 mg/cm³. This description takes gross dimensions of the support into account. The thickness and uniformity of the sorbent coating on the support vary depending upon the specific support, sorbent, and coating method selected.

In one embodiment, the process of this invention is conducted in a single sorbent bed, wherein in adsorption mode a flow of the contaminated fluid hydrocarbon containing a metal contaminant in an initial metal concentration is contacted with a fixed bed of the sorbent for a time during which an effluent stream exiting the sorbent bed contains an acceptably reduced concentration of the metal contaminant. (The skilled person will appreciate that the metal contaminant concentration is typically expressed as a weight percent of metal contaminant based upon the weight of the fluid hydrocarbon.) When the sorbent bed is fully or partially saturated and an effluent stream exiting the sorbent bed contains an unacceptable concentration of the metal contaminant (a condition referred to as "break-through"), the flow of fluid hydrocarbon is stopped. In one embodiment, the saturated or partially saturated sorbent bed functions as a stand-alone, non-regenerable cartridge and it is replaced. In another embodiment, the saturated or partially saturated sorbent bed functions as a regenerable cartridge. In this embodiment, regeneration may involve washing the sorbent bed with acid. If regeneration is employed, the process involves alternating the sorbent bed between adsorption and desorption modes over many reiterations.

The process of this invention is conducted under any process conditions providing for acceptable removal or reduction of the metal(s) from the contaminated fluid hydrocarbon. Typically, the adsorption process is conducted at ambient temperature, suitably defined for this purpose as ranging from about −20° C. to about +38° C., and ambient pressure, suitably defined as about 1 atm (+/−10 percent).

The process of this invention typically reduces the concentration of metal(s) in the fluid hydrocarbon to less than about 50 ppb; in one embodiment, to less than about 10 ppb; and in another embodiment to non-detectable levels of less than 5 ppb, as analyzed by inductively coupled plasma mass spectrometry (ICP-MS). With this invention, the purified fluid hydrocarbon, or purified liquid hydrocarbon fuel as applicable, exhibits excellent thermal oxidation stability, as assessed for example by standard testing method ASTM D3241 (JFTOT). Advantageously, purified liquid hydrocarbon fuels of this invention substantially retain their initial concentration of icing inhibitor(s), as measured for example by testing method ASTM D5006 (FSII inhibitor). Even more advantageously, purified liquid hydrocarbon fuels of this invention substantially retain their initial concentration of corrosion inhibitor(s), as measured for example by testing method ASTM D130. The meaning of the term "substantially retain" should be taken in context depending upon the specific additive alluded to and its specific method of analysis. The analysis for icing inhibitor, for example, is direct and quantifiable, as illustrated in Example 4 hereinafter. Accordingly, for icing inhibitors, the term "substantially retain" means that at least about 80 percent, and preferably at least about 90 percent by weight of the initial concentration of icing inhibitor is retained in the purified hydrocarbon. In contrast, the analysis for corrosion inhibitor is indirect and less quantifiable. Thus, the term "substantially retain" in this context means that analytical test results for corrosion inhibitors pre and post metal filtration are closely similar.

Figure 1:
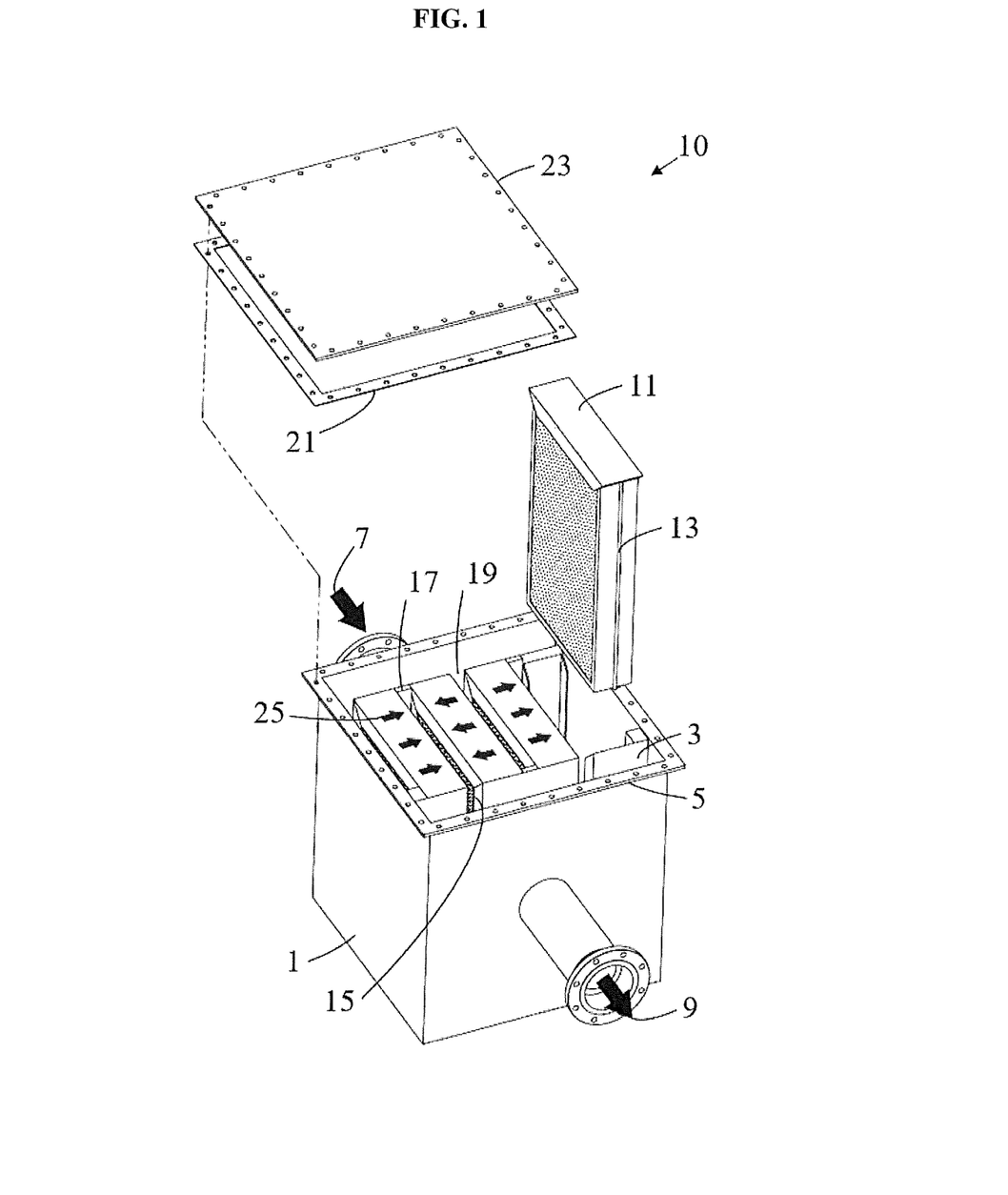
FIG. 1 presents an illustration of an embodiment of a metal contaminant filter system of this invention.

FIG. 1 illustrates an embodiment of a metal contaminant filter system 10 of this invention. The contaminant filter system 10 comprises (a) a housing 1 defining an exterior wall 5 and an interior plenum 3, the housing 1 in this instance of square cross-sectional shape. The housing 1 has connected thereto an inlet 7 configured to fluidly couple a source of a metal-contaminated fluid hydrocarbon to the interior plenum 3, and further has connected thereto an outlet 9 configured to exit a purified fluid hydrocarbon from the interior plenum 3. The filter system 10 further comprises at least one filter element (or filter cartridge) 11 disposed within the interior plenum 3 of housing 1. More particularly, as shown in FIG. 1, three filter elements 11 are positioned within housing 1, and one filter element 11 is depicted as removed from housing 1 so as to illustrate filter element structure in detail. Each filter element, as seen in filter element 11, contains or holds in place the sorbent bed 13 comprising the graphene oxide or functionalized graphene oxide sorbent capable of removing the metal contamination from the metal-contaminated fluid hydrocarbon. Each bed of sorbent 13 may be provided in a form of a powder, pellet, or as a layered sorbent supported on a suitable support as noted hereinbefore.

As illustrated in FIG. 1, the four filter elements 11 are stacked parallel and in spaced-apart relation to each other creating longitudinal flow paths 15 and 19 between each pair of adjacent filter elements 11. The ends of the filter elements 11 are blocked with flow restrictors 17 in a manner that creates flow paths alternating between inlet flow paths 19 between adjacent filter elements 11 and exit flow paths 15 between alternating adjacent filter elements 11. Fluid flow patterns are illustrated by black arrows 25. In one preferred embodiment, each filter element 11 comprises a plurality of ultra-short-channel-length meshes supporting the graphene oxide sorbent or functionalized derivative thereof, the meshes being stacked parallel to inlet paths 7 and outlet paths 9 creating flow paths 25 through each filter element 11. As shown in FIG. 1, the housing 1 includes a top wall comprising gasket 21 and lid 23, here shown removed from the housing for illustrative purposes.

Figure 2:
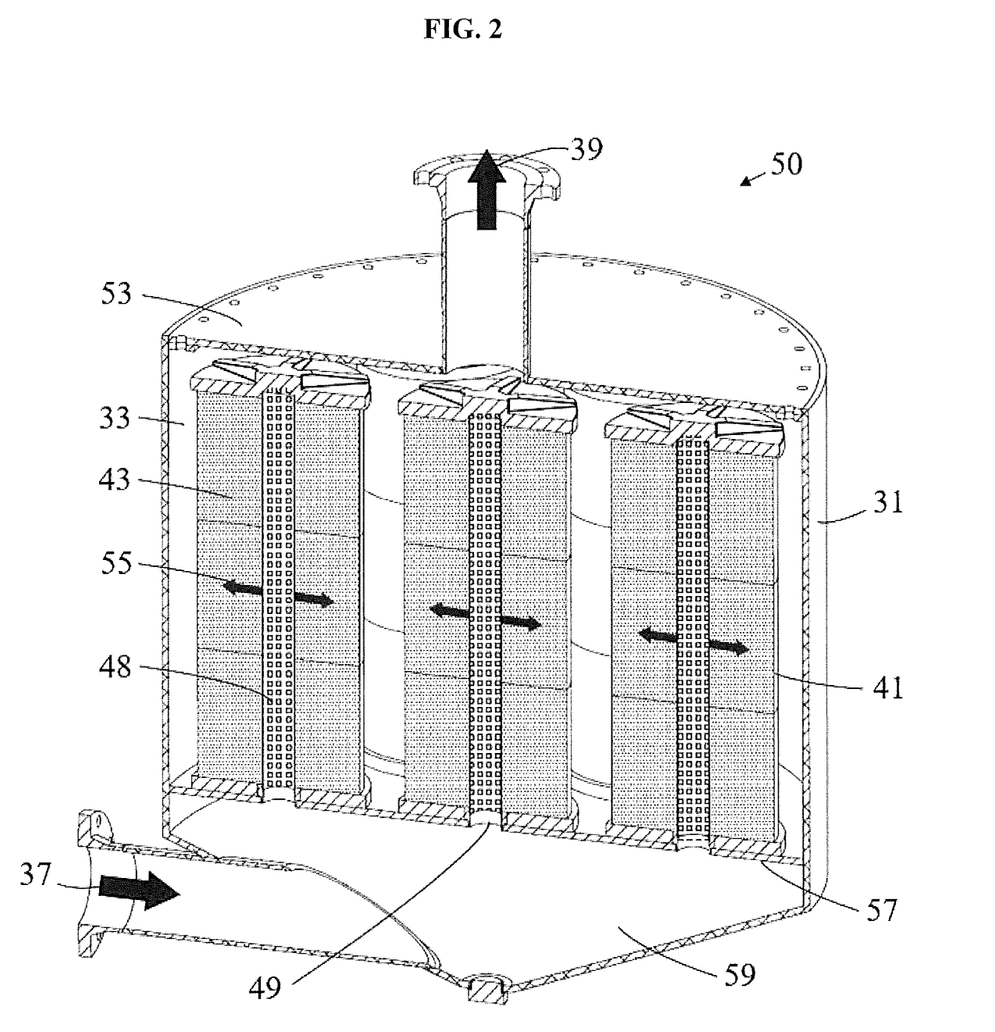
FIG. 2 presents an illustration of another embodiment of a metal contaminant filter system of this invention.

FIG. 2 provides an illustration of another embodiment 50 of the filter system of this invention defining a housing 31, lid 53, platform 57, interior entry plenum 59 and interior exit plenum 33. The housing 31 has a cylindrical shape and further comprises a system inlet 37 in fluid communication with the entry plenum 59. The housing 31 also comprises a system outlet 39 in fluid communication with the exit plenum 33. Three cylindrical filter elements 41 are disposed within plenum 33, supported by platform 57, and aligned parallel to each other and parallel to a longitudinal axis of the cylindrical housing 31. Each filter element 41 comprises a filter element inlet 49 disposed in fluid communication with entry plenum 59 and system inlet 37. Each filter element inlet 49 is fluidly connected to its corresponding filter element flow channel 48, disposed centrally along a longitudinal axis of each filter element 41. Each filter element 41 contains or holds in place sorbent bed 43 having an inlet side at flow channel 48 and an exit side at the outer diameter of the sorbent bed 43 facing plenum 33. Functionally, the metal contaminated fluid hydrocarbon enters the system inlet 37, passes through entry plenum 59, entering filter element inlet 49, passing through flow channel 48. The contaminated hydrocarbon fluid then flows radially through the sorbent bed 43, following black arrows 55 in FIG. 2, exiting into exit plenum 33 and from thence through system outlet 39.

There is no restriction on the shape of the filter elements, which may have a circular, square, rectangular, or other transverse cross-section. In one embodiment, as applicable to FIG. 1, each filter element 11 comprises a plurality of mesh sheets, for example, from about 500 to about 2,000 mesh sheets, which may be loosely packed or compressed, as desired. In another embodiment, as applicable to FIG. 2, each filter element 43 comprises a compressed cylindrical coil of mesh defined by an inner diameter facing inlet 48 and an outer diameter facing plenum 33. It has been found that compression reduces volume and overall dimensions of the filter system without sacrificing sorbency effectiveness. A selected residence time through the filter element(s) is chosen so as to remove more than 95 percent, preferably, more than 99 percent, of the contaminant metal from the fluid hydrocarbon. The flow velocity through the filter element(s) is selected to provide for the desired residence time. In one embodiment, the flow velocity ranges from about 0.01 meter/second (0.01 m/s) to about 1.0 m/s. In one embodiment, the filter system includes a pre-filter, or a post-filter, or a combination of pre- and post-filters wherein a different and typically larger-grade sorbent media is used as a flow distributor or as a pressure equalizer; and wherein the pre-filter removes solid particulates, fines and other undesirable objects in the fluid to be filtered.

Figure 3:
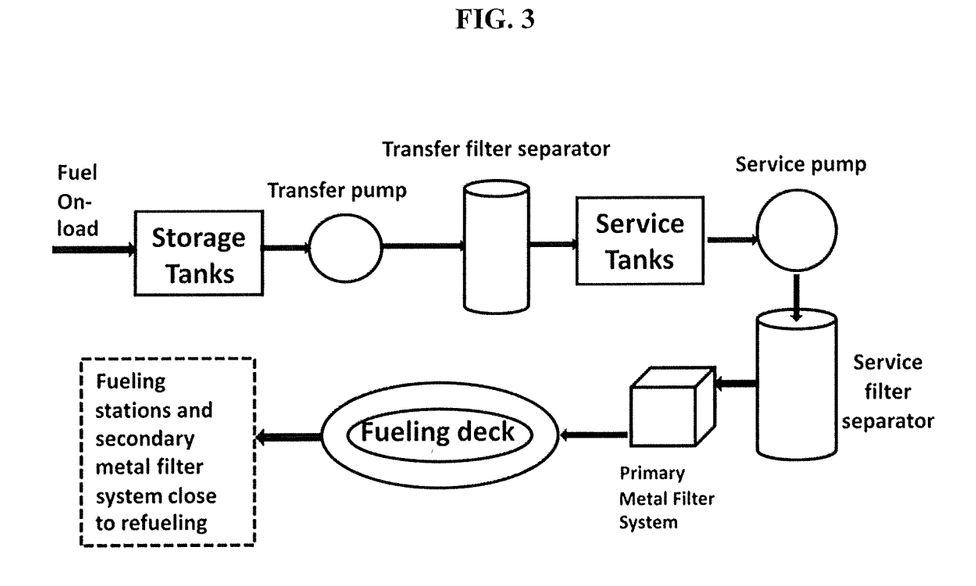
FIG. 3 depicts a diagram of a fuel supply system incorporating the metal contaminant filter system of this invention.

It is envisioned that the metal contaminant filter system of this invention is easily retrofit into any pre-existing fueling system. FIG. 3 illustrates a typical shipboard aircraft fueling system comprising a plurality of fuel storage tanks and a transfer pump that transfers the fuel from the storage tanks to a transfer filter separator (or centrifugal purifier), which functions to remove bulk particulates from the fuel. The fuel is then transferred to one or more service tanks, after which a service pump transfers the fuel from the service tank to a service filter separator where particulates and water are removed from the fuel. We conceive that the metal contaminant filter system of this invention is easily incorporated after the service filter separator, but prior to the shipboard fueling station(s). Thus, in one embodiment the metal contaminant filter system of this invention is disposed last in line to remove dissolved metal contaminants and any residual particulates from the fuel prior to being dispensed to the shipboard fueling station(s). Post-metal decontamination, the purified fuel stands in improved condition for use in aircraft refueling at the fueling stations. In another embodiment, however, prior to the purified fuel being dispensed to the shipboard fueling station(s), the purified fuel leaving the contaminant metal filter system of this invention ("primary filter system") is passed through a polishing filter of similar invention construction ("secondary filter system"), the latter functioning to reduce any residual metal contamination to non-detectable levels of less than 5 ppb.

EMBODIMENTS

Example 1

Several graphene oxide (GO)-based materials were purchased or prepared and tested as sorbents for removing copper ions from a contaminated liquid hydrocarbon. The graphene-based sorbents were as follows: (1) GO, 4 wt. percent oxygen; (2) GO, 14 wt. percent oxygen; (3) GO, 40 wt. percent oxygen; (4) GO-S, 4 wt. percent oxygen, modified with sulfuric acid; (5) GO-Cl, 4 wt. percent oxygen, modified with hydrochloric acid; and (6) GO-N2, 4 wt. percent oxygen, modified with ammonium hydroxide. The graphene oxide powder was obtained from Angstron Materials and comprised a few-layer graphene oxide platelets with a thickness of 1-2 nanometers (1-2 nm); a lateral dimension of approximately 5 μm; a carbon content of 60-80 percent; oxygen content as noted; and a surface area of 420 m²/gm.

Preparation GO-S: A sample of graphene oxide (1 g) was mixed with aqueous sulfuric acid (10 wt. percent) at 40-50° C. for 8 h, then recovered by filtration. The resulting acid-treated graphene oxide was washed until the washings were pH neutral and then dried at 80° C.

Preparation of GO-Cl: A sample of graphene oxide (1 g) was mixed with aqueous hydrochloric acid (10 wt. percent) at 40-50° C. for 8 h, then recovered by filtration. The resulting acid-treated graphene oxide was washed until the washings were pH neutral, then dried at 80° C.

Preparation of GO-N2: The graphene oxide powder was mixed in a flask with excess aqueous ammonium hydroxide (30 wt. percent solution) in a ratio of 30 g ammonium hydroxide solution per gram GO. The mixture was heated to 90-100° C. under reflux for 48h. Periodically, the level of the mixture was checked and replenished with ammonium hydroxide as needed, as some ammonia gas was released from solution under the reaction conditions. At the end of 48 h a solid product was recovered by filtration, washed with deionized water until the pH of the filtrate measured neutral. The solid was further dried at 90° C. overnight.

All sorbents were analyzed by nitrogen physisorption to determine surface area and by thermal-gravimetric analysis (TGA) to confirm baseline properties of the graphene material. Samples are identified in Table 1.

TABLE 1

Graphene Sorbents For Copper Removal

| Sample ID | Sample description | Surface Area, m²/g |
|---|---|---|
| GO | Three Graphene oxides containing varying amounts of oxygen: | 410 |
| 1- | 4 wt.% O | |
| 2- | 14 wt.% O | |
| 3- | 40 wt. % O | |
| 4- GO-S | Graphene oxide treated with H₂SO₄ | 320 |
| 5- GO-Cl | Graphene oxide treated with HCl | 296 |
| 6- GO-N2 | Graphene oxide treated with NH₄OH | 384 |

A metal-contaminated liquid hydrocarbon was prepared by adding 400 parts per billion (400 ppb) copper in the form of copper ethylacetoacetate in hexane. For each test, a fixed volume of the contaminated mixture (100 cm³) was filtered through a fixed bed of the graphene-based sorbent (250 mg). Post filtration, the purified liquid hydrocarbon was passed through a filter to remove particulate matter (0.45 μm polytetrafluoroethylene, PTFE) and collected in an Erlenmeyer flask. No debris was seen in the fluid of any sample collected after PTFE filtration. The PTFE filtration removes bulk particulate debris but passes through dissolved or suspended metal contamination if any persists.

A copper analysis test used for detecting ppb levels of copper ions in liquid hydrocarbons was developed based on a method published by Lu et. al. (Energy & Fuels 2003, 17, 699). The sample to be tested was treated with α-tocopherol, so as to reduce all copper ions to $Cu^{+1}$. Thereafter, the $Cu^{+1}$ ions were reacted in solution with bathocuproine to form a yellow-colored complex. The color intensity was measured with a spectrometer at a wavelength of 474 nm and compared against a calibration curve of samples containing known copper concentrations.

Results from the Cu analysis procedure are shown in Table 2. With an initial copper concentration of 400 ppb dissolved in the liquid hexane, it was found that all graphene oxide-based sorbents removed a significant portion of the copper ions.

TABLE 2

Post-Removal Copper Concentration in Hexane

| Sorbent | Absorbance, a.u. | [Cu], ppb |
|---|---|---|
| GO-4% O | 0.002 | 8.90 |
| GO 14% O | 0.010 | 55.0 |
| GO 40% O | 0.015 | 100.0 |
| GO-S | 0.011 | 60.00 |
| GO-Cl | 0.012 | 65.00 |
| GO-N₂ | 0.009 | 50.00 |

Example 2

Example 1 was repeated, with the exception that a copper contaminated jet propulsion fuel JP-5 was used in place of hexane. In this case, a fixed bed filter comprising the powdered GO-based sorbent (250 mg) was installed inside a glass filtration funnel. Post-purification the fuel passed through a glass fitted disc of porosity 25-50 μm, which was also used as a support for the sorbent, and then collected in an Erlenmeyer flask. No debris was seen in the fluid that passed through the glass disc filter. Fluid flow through the fixed bed was accelerated by using a vacuum pump to create a pressure differential between an inlet and an outlet of the fixed bed, so as to overcome a pressure drop associated with fixed powder beds. The flow rate of the fluid through the fixed bed was about 120 cm³/min.

Post filtration the resulting purified samples were checked visually with back illumination to assess whether particulate contamination of the fuel occurred. No particulate was observed, indicating that no contamination of the fuel occurred with the GO-based sorbent. The purified samples were analyzed for copper concentration by ICP-MS analysis (Intertek Labs). The analysis involved dissolving each sample in xylene and subjecting it to pneumatic nebulization into a radio frequency plasma where energy transfer processes cause desolvation, atomization, and ionization. The ions were extracted from the plasma through a differentially pumped vacuum interface and separated on the basis of their mass-to-charge ratio (m/z) by a mass spectrometer. Results are summarized in Table 3. As seen, three of the sorbents removed copper to a concentration less than the test detection limit (5 ppb).

TABLE 3

ICP-MS analysis results of Purified JP-5 Fuel

| Sample | Purification Treatment | Cu, ppb | Removal rate, % |
|---|---|---|---|
| Original Copper Contaminated JP-5 | None | 423 | NA[1] |
| Purified JP-5 | GO-14% O | 24 | 94.3 |
| Purified JP-5 | GO-4% O (Lot 1) | n.d.[1] | >98.8 |
| Purified JP-5 | GO-4% O (Lot 2) | n.d.[1] | >98.8 |
| Purified JP-5 | GO-S | n.d.[1] | >98.8 |

[1]NA = not applicable;
n.d. = less than detection limit of 5 ppb.

Example 3

Liquid hydrocarbon fuels can degrade during storage and use, generally through autoxidation processes catalyzed by copper and other metal ions. One qualitative indication of oxidation instability is change in color when exposed to light. Two samples of liquid hydrocarbon fuel were exposed to ambient sunlight for 7 days to test oxidation stability. One sample E-3 consisted of the purified JP-5 fuel, which was originally contaminated with 423 ppb Cu and then treated in accordance with the filtration procedure of this invention over the GO sorbent (4% [O]) as described in Example 2. The treated sample had no detectable level of Cu. For comparative purposes, the other sample tested, CE-3, was the untreated JP-5 fuel containing 423 ppb copper. Upon exposure to sunlight, the sample E-3 treated in accordance with this invention did not discolor, but rather retained its clear colorless tone, consistent with excellent oxidation stability. The comparative sample CE-3 showed a significant yellowing consistent with an oxidation instability catalyzed by the presence of copper ions.

Example 4

The purified fuel sample E-3 of this invention and the comparative example of contaminated fuel CE-3 from Example 3 hereinabove were submitted to a certified fuel analysis laboratory for analysis of copper concentration (Test ITM 1050), oxidation stability (JFTOT test, ASTM D3241), presence of icing inhibitor (FSII ether type) (ASTM D5006), and effectiveness of corrosion inhibitors (lubricity improvers) to copper (ASTM D130), corrosiveness copper strip). Results are shown in Table 4.

TABLE 4

Comparative analysis report of JP-5 fuel (before and after purification)

| Method | Test | Result |
|---|---|---|
| | CE-3 - Untreated JP-5 as received | |
| ITM 1051 | Metals in Organic Matrix by ICP-MS | 423 ppb |
| ASTM D5006 | Fuel System Icing Inhibitors (FSII, Ether Type) | Analysis Temperature 20° C. FSII 0.090 vol. % |
| ASTM D3241 | Thermal Oxidation Stability (JFTOT) | Test Temperature of Fuel 260° C. Heater Tube Deposit Color <1 Max. Pressure Drop Across Filter >25 mm Hg Time to Reach Pressure Differential of 25 mm Hg = 73 min. Fuel Volume 450 ml |
| ASTM D130 | Corrosion - Copper Strip | Copper Corrosion @ 100° C. (212° F.)/2 hr Result: 1a |
| | E-3 - Purified JP-5, treated in accordance with invention | |
| ITM 1051 | Metals in Organic Matrix by ICP-MS | 6 ppb |
| ASTM D5006 | Fuel System Icing Inhibitors (Ether Type) | Analysis Temperature 20° C. FSII 0.090 vol. % |
| ASTM D3241 | Thermal Oxidation Stability (JFTOT) | Test Temperature of Fuel 260° C. Heater Tube Deposit Color <1 Max. Pressure Drop Across Filter 0 mm Hg Spent Fuel Volume 450 ml |
| ASTM D130 | Corrosion - Copper Strip | Copper Corrosion @ 100° C. (212° F.)/2 hr Result: 1b |

From Table 4 it is seen that the purified JP-5 fuel E-3 of this invention contained only 6 ppb Cu; whereas the original contaminated sample CE-3 contained 423 ppb Cu. In addition, the purified sample beneficially retained the FSII icing inhibitor throughout the copper purification procedure of this invention over the GO-based sorbent. Moreover, the purified fuel of E-3 passed the JFTOT oxidation stability test; while the copper contaminated fuel CE-3 failed the oxidation stability test. Additionally, the purified fuel E-3 treated with the method of this invention retained the corrosion inhibitor, as evidenced by the nearly identical corrosion resistance measured for the purified fuel, as compared with the contaminated fuel CE-3. These results demonstrate the excellent efficacy of the subject invention wherein the graphene oxide-based sorbent composition removes copper from contaminated JP-5 fuel without affecting other important fuel properties, such as icing and corrosion inhibition.

Example 5

Three sorbent beds (100 ml each) were assembled, each containing one of the following sorbents (5 g): (E-5a) Graphene oxide (GO), Average lateral dimensions 2-4 μm, surface area 450 m$^2$/g, oxygen content 17 wt. percent; (E-5b) Graphene oxide modified with monoethanolamine (MEA-GO); (E-5c) Graphene oxide modified with ammonium hydroxide (NH3-GO). For comparative purposes (CE-5), a bed of unmodified graphene (reduced GO or rGO) was assembled. A mixture of liquid hydrocarbon containing 5,000 ppb of copper contaminant was synthesized from dodecane and copper acetoacetate. The contaminated hydrocarbon was continuously passed through each sorbent bed.

Figure 4:
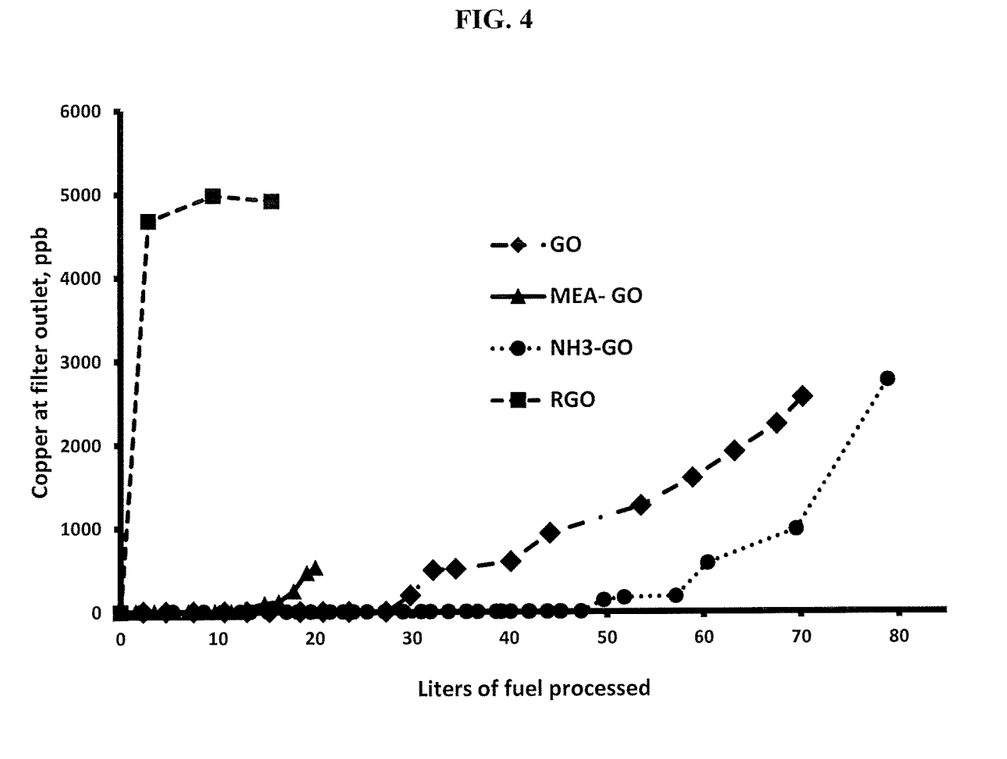
FIG. 4 presents a graph plotting copper concentration (ppb) in a liquid hydrocarbon fuel stream at a sorbent bed outlet versus volume (1) of the liquid hydrocarbon fuel processed through the sorbent bed.

FIG. 4 provides a plot of copper concentration measured at the outlet of the sorbent bed as a function of liters of fuel processed. Breakthrough was measured when the copper concentration at the outlet of the sorbent bed equaled 10 percent (500 ppb) of the inlet copper concentration (5,000 ppb). For two sorbents E-5a (GO) and E-5c (NH3-GO) testing continued until the copper outlet concentration equaled 50 percent (2,500 ppb) of the incoming copper concentration (5,000 ppb). For each sorbent and each breakthrough, the area under the curve shown in FIG. 4 was integrated providing in each instance a total quantity of copper passed through the sorbent bed ($Cu_{out}$); which was subtracted from the total quantity of copper passed into the bed ($Cu_{in}$ calculated as liters of fuel times copper concentration), thereby yielding the total quantity of copper (mg) retained by the sorbent within the bed ($Cu_{adsorbed}$). Sorbent bed adsorption capacity was then calculated as the quantity of adsorbed copper divided by the quantity of sorbent used; for example, a 5 weight percent (5 wt. %) capacity means that 100 g of sorbent will retain 5 g of copper. Sorbent capacity results are presented in Table 5.

TABLE 5

Measured sorbent capacity as a function of Cu removal rate

| Exp. | Sorbent Properties | Capacity at 10% of feed, (wt. %)[1] | Cu Removal Rate, %[1,3] | Capacity at 50% of feed, (wt. %)[2] | Cu Removal Rate, %[2,3] |
|---|---|---|---|---|---|
| E-5a | GO | 3.2 | 98.5 | 6.03 | 86.0 |
| E-5b | MEA-GO | 2.0 | 98.4 | — | — |
| E-5c | NH3-GO | 5.5 | 99.1 | 7.6 | 93.0 |
| CE-5 | Graphene (rGO) | 0.3 | 20.2 | 0.3 | 9.0 |

[1]"Capacity at 10% of feed" = weight percent Cu adsorbed relative to weight of sorbent, when Cu breakthrough in the outlet stream reached 10 percent of feed (500 ppb).
[2]"Capacity at 50% of feed" = weight percent Cu adsorbed relative to weight of sorbent, when Cu breakthrough in the outlet stream reached 50 percent of feed (2,500 ppb).'
[3]"Removal Rate" is defined as total percentage of inlet Cu removed at breakthrough.

By comparing Examples E-5(a-c) with Comparative Experiment (CE-5), it is seen that the sorbent capacity to remove copper and the rate of copper removal are considerably higher in the graphene oxide and amine-modified graphene oxide sorbents, as compared with pure graphene. Examples E-5(a) and E-5(c) as well as Comparative Experiment CE-5 also show that a sorbent's capacity to remove copper increases as fluid flow increases as far as the test was conducted, but at a cost to the efficiency of removing copper.

Example 6

JP-5 fuel was contaminated with copper by submerging copper plates in the fuel and monitoring the copper uptake in the fuel over time, until the copper concentration in the fuel reached 500 ppb as measured by both inductively coupled plasma-mass spectrometry (ICP-MS) and Atomic Adsorption Spectroscopy (AAS). A sample of the copper-contaminated fuel was passed through each of two sorbent beds (100 ml) containing a graphene oxide sorbent (5 g), as follows: E-6a—graphene oxide (GO), and E-6b—graphene oxide modified with ammonium hydroxide (NH3-GO) as described in Example 5.

Figure 5:
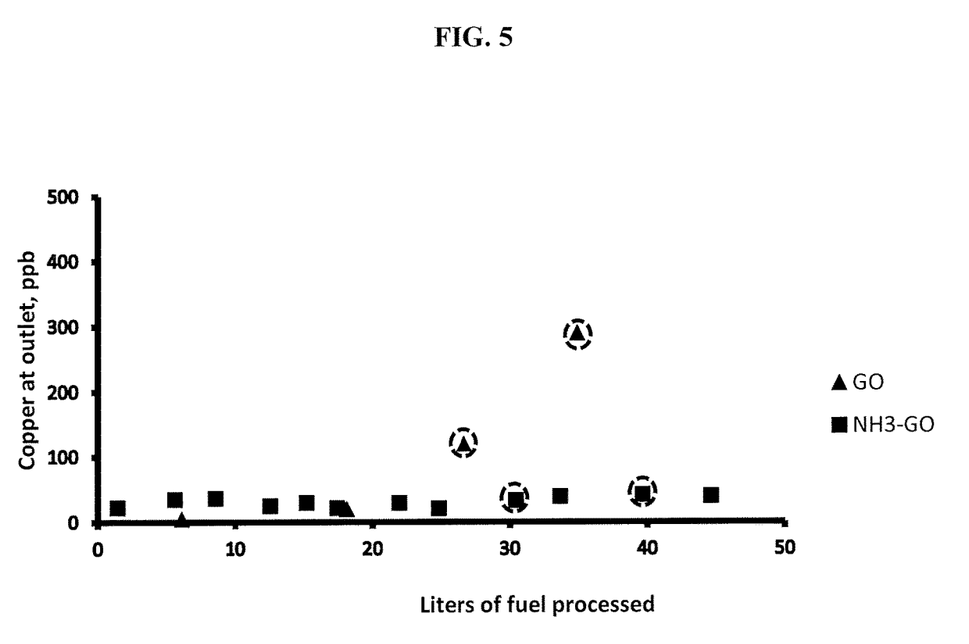
FIG. 5 presents another graph of copper concentration (ppb) in a liquid hydrocarbon fuel stream at a sorbent bed outlet versus volume (1) of the liquid hydrocarbon fuel processed through the sorbent bed.

Periodically samples of filtered fuel were collected from the outlet of each bed and analyzed for copper content by AAS. The analysis involved calibrating the AAS spectrometer instrument with fuels of known copper concentration, per ASTM method UOP391-09, Trace Metals in Organics by ASTM International. Results are shown in FIG. 5, which depicts a plot of copper concentration (ppb) at the sorbent bed outlet as a function of volume (1) of contaminated JP-5 fuel passed through the sorbent bed. Data points circled on FIG. 5 were also measured by ICP-MS analysis. The data illustrate that up to a volume of about 25 liters of contaminated fuel processed, the graphene oxide and amine-modified graphene oxide adsorb the copper contaminant at about the same efficiency. Beyond about 25 liters, the amine-modified graphene oxide exhibits superior adsorption capacity, as compared with the unmodified graphene oxide.

Example 7

A solution (500 ml) containing n-dodecane and nickel (15.7 ppm) was prepared by dissolving nickel acetoacetate in n-dodecane via stepwise addition using a small amount of ethanol as a carrier. The solution was passed through a sorbent bed comprising an ammonium hydroxide-modified graphene oxide (1 g). The pre-filtration and post-filtration fuel samples were analyzed by ICP-MS (Standard Test ITM-1051), resulting in a nickel concentration in the pre-filtered solution of 15,700 ppb wt. In contrast, post-filtration over the amine-modified graphene oxide bed, the nickel concentration was reduced to less than 5 ppb wt.

Example 8

A solution (500 ml) containing n-dodecane and iron (11.9 ppm) was prepared by dissolving an appropriate amount of iron acetoacetate in n-dodecane via stepwise addition using a small amount of ethanol as a carrier. The solution was passed through a sorbent bed comprising an ammonium hydroxide-modified graphene oxide (1 g). The pre-filtration and post-filtration fuel samples were analyzed for iron content by ICP-MS, with the results showing a pre-filtration iron concentration of 11,900 ppb wt. Post-filtration over the amine-modified graphene oxide bed, the iron concentration was reduced to less than 25 ppb wt., resulting in an iron removal rate of 99.9 percent under conditions tested.

Example 9

Figure 6:
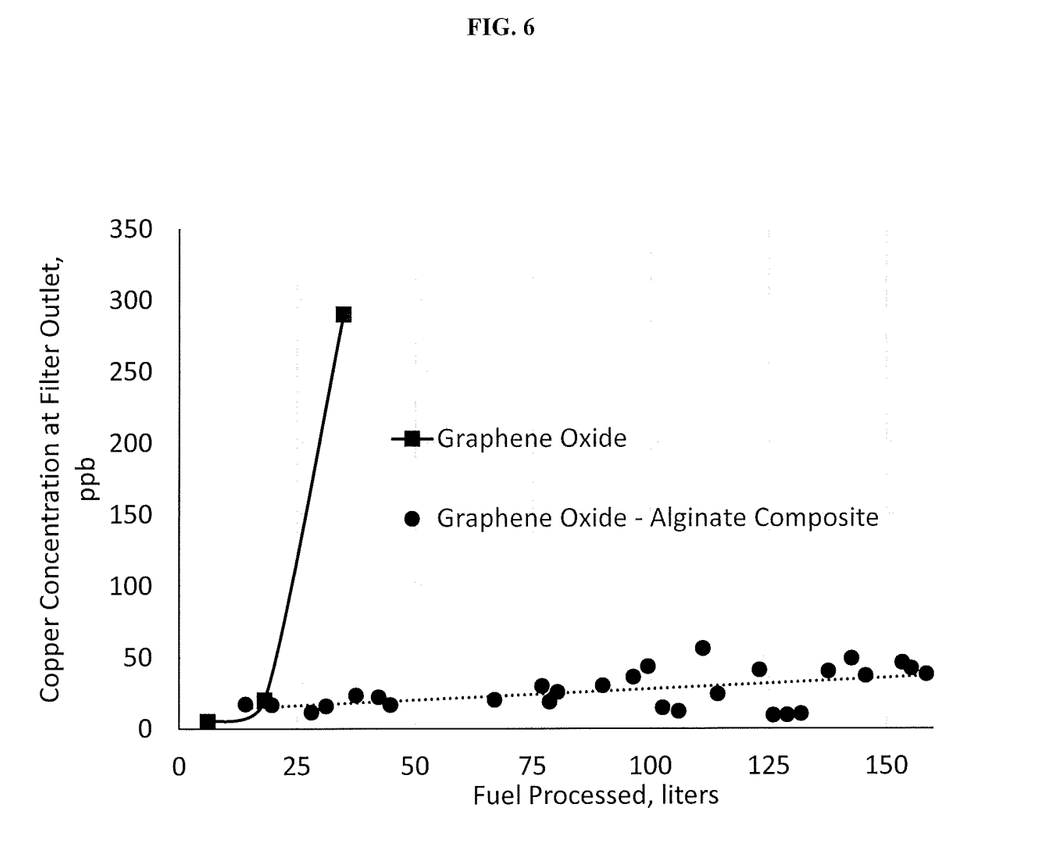
FIG. 6 presents a graph of copper concentration (ppb) in a liquid hydrocarbon stream at a sorbent bed outlet versus volume (liters) of the liquid hydrocarbon fuel processed through the sorbent bed.

A sorbent comprising graphene oxide and the sodium salt of alginic acid was synthesized by the incipient wetness impregnation method. An aqueous solution of the sodium salt of alginic acid was prepared by adding sodium alginate (Sigma Aldrich, algin, alginic acid sodium salt from brown algae, 1.5 g) to deionized water (100 mL). The solution was added dropwise to graphene oxide (3.5 g, Global Graphene Group N002PDE). The resulting alginate-functionalized graphene oxide was dried overnight at 100° C. The dried sorbent was loaded into a vacuum filter cup and connected to a glass filter base (47 mm dia) with a pore size of under 500 nm, effectively creating a sorbent bed filter. The sorbent bed was challenged with JP-5 fuel contaminated with copper derived from submerging copper plates into the fuel. The inlet concentration of copper in the fuel was approx. 500 ppb. Periodically, samples of fuel that had been filtered through the sorbent were taken and analyzed for outlet copper content by AAS. A total of 160 liters of contaminated fuel was passed through the sorbent bed. The GO-alginate sorbent effectively removed a total of 57.6 mg of copper dissolved in the fuel, with no breakthrough measured. SEM pictures taken of the sorbent before and after filtration showed that the sorbent maintained the layered structure of the GO. As seen in FIG. 6 the GO-alginate sorbent removed more than four times more copper than untreated GO tested under similar conditions.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A process of removing a metal contaminant from a fluid hydrocarbon, comprising contacting a contaminated fluid hydrocarbon comprising a metal contaminant provided in an initial metal concentration with a sorbent comprising graphene oxide treated with a polycarboxylic acid or a salt thereof; the contacting being conducted under conditions sufficient to provide a purified fluid hydrocarbon comprising a reduced metal concentration of the metal contaminant as compared with the initial metal concentration.

2. The process of claim 1 wherein the polycarboxylic acid is selected from aliphatic polycarboxylic acids, cycloaliphatic polycarboxylic acids, aromatic polycarboxylic acids, and saccharide polycarboxylic acids, optionally combined with alumina or a transition metal oxide.

3. The process of claim 1 wherein the polycarboxylic acid or salt thereof is selected from the group consisting of: oxalic acid, succinic acid, maleic acid, citric acid, itaconic acid, 1,2,3-propane tricarboxylic acid, 1,2,3,4-butane tetracarboxylic acid, 2,3,5-hexane tricarboxylic acid, phthalic acid, isophthalic acid, terephthalic acid, alginic acid, chitosan polycarboxylic acid, and metal salts of the aforementioned acids wherein the metal is selected from Groups IA, IIA and the transition metals.

4. The process of claim 1 wherein the polycarboxylic acid is alginic acid or the sodium, potassium, or calcium salt thereof.

5. The process of claim 1 wherein the sorbent is supported on an ultra-short-channel-length mesh, optionally having a surface area of at least 100 m$^2$/g and a cell density ranging from 100 to 1,000 cells/cm$^2$.

6. The process of claim 1 wherein the metal contaminant is selected from vanadium, manganese, iron, cobalt, nickel, copper, lead and mixtures thereof.

7. The process of claim 6 wherein the metal contaminant is copper.

8. The process of claim 1 wherein the fluid hydrocarbon comprises a hydrocarbon that exists in a gaseous or liquid phase at a temperature ranging from −40° C. to +100° C. at about 1 atm pressure.

9. A process of removing a metal contaminant from a liquid hydrocarbon fuel, comprising contacting a contaminated mixture comprising a liquid hydrocarbon fuel, at least one fuel additive provided in an initial additive concentration, and a metal contaminant provided in an initial metal concentration, with a sorbent comprising graphene oxide treated with a polycarboxylic acid or a salt thereof; the contacting being conducted under conditions sufficient to provide a purified hydrocarbon fuel comprising the liquid hydrocarbon fuel, the at least one fuel additive provided in substantially the initial additive concentration, and a reduced metal concentration of the metal contaminant as compared with the initial metal concentration.

10. The process of claim 9 wherein the polycarboxylic acid is selected from aliphatic polycarboxylic acids, cycloaliphatic polycarboxylic acids, aromatic polycarboxylic acids, and saccharide polycarboxylic acids, optionally combined with alumina or a transition metal oxide.

11. The process of claim 9 wherein the polycarboxylic acid or salt thereof is selected from the group consisting of: oxalic acid, succinic acid, maleic acid, citric acid, itaconic acid, 1,2,3-propane tricarboxylic acid, 1,2,3,4-butane tetracarboxylic acid, 2,3,5-hexane tricarboxylic acid, phthalic acid, isophthalic acid, terephthalic acid, and alginic acid, and metal salts of the aforementioned acids, wherein the metal is selected from Groups IA, IIA, and the transition metals.

12. The process of claim 9 wherein the polycarboxylic acid is alginic acid or a sodium, potassium, or calcium salt thereof.

13. The process of claim 9 wherein the sorbent is supported on an ultra-short-channel-length mesh, optionally having a surface area of at least 100 m$^2$/g and a cell density ranging from 100 to 1,000 cells/cm$^2$.

14. The process of claim 9 wherein the metal contaminant is selected from vanadium, manganese, iron, cobalt, nickel, copper, lead and mixtures thereof.

15. The process of claim 14 wherein the metal contaminant is copper.

16. The process of claim 9 wherein the fluid hydrocarbon comprises a hydrocarbon that exists in a gaseous or liquid phase at a temperature ranging from −40° C. to +100° C. at about 1 atm pressure.

17. The process of claim 9 wherein the at least one fuel additive is selected from the group consisting of icing inhibitors, corrosion inhibitors, anti-oxidants, anti-static agents, emulsifiers, biocides, and mixtures thereof.

18. The process of claim 17 wherein the icing inhibitor is methyl carbitol, ethanol, or ethylene glycol monomethyl; or wherein the corrosion inhibitor is benzotriazole, zinc thiophosphate, DCI-4A, DCI-6A, DCI-4, or DCI-30.

19. A purified liquid hydrocarbon fuel being prepared by a process comprising: contacting a contaminated liquid hydrocarbon fuel comprising at least one fuel additive in an initial additive concentration, and comprising a metal contaminant in an initial metal concentration of greater than 5 ppb, with a sorbent comprising graphene oxide treated with a polycarboxylic acid or a salt thereof, the contacting being conducted under conditions sufficient to produce the purified liquid hydrocarbon fuel comprising the at least one fuel additive in substantially the initial additive concentration, and further comprising the metal contaminant in a reduced metal concentration equal to or less than 5 ppb.

20. The purified liquid hydrocarbon fuel of claim 19 wherein the polycarboxylic acid is selected from aliphatic polycarboxylic acids, cycloaliphatic polycarboxylic acids, aromatic polycarboxylic acids, and saccharide polycarboxylic acids, optionally combined with alumina or a transition metal oxide.

21. The purified liquid hydrocarbon fuel of claim 19 wherein the polycarboxylic acid or salt thereof is selected from the group consisting of: oxalic acid, succinic acid, maleic acid, citric acid, itaconic acid, 1,2,3-propane tricarboxylic acid, 1,2,3,4-butane tetracarboxylic acid, 2,3,5-hexane tricarboxylic acid, phthalic acid, isophthalic acid, terephthalic acid, and alginic acid, and metal salts of the aforementioned acids wherein the metal is selected from the Group IA, IIA or transition metals.

22. The purified liquid hydrocarbon fuel of claim 19 wherein the polycarboxylic acid is alginic acid or a sodium, potassium or calcium salt thereof.

23. The purified liquid hydrocarbon fuel of claim 19 wherein the sorbent is supported on an ultra-short-channel-length mesh, optionally having a surface area of at least 100 m$^2$/g and a cell density ranging from 100 to 1,000 cells/cm$^2$.

24. The purified liquid hydrocarbon fuel of claim 19 wherein the metal contaminant is selected from vanadium, manganese, iron, cobalt, nickel, copper, lead and mixtures thereof.

25. The purified liquid hydrocarbon fuel of claim 19 wherein the at least one fuel additive is selected from the group consisting of icing inhibitors, corrosion inhibitors, anti-oxidants, anti-static agents, emulsifiers, biocides, and mixtures thereof.

\* \* \* \* \*